Figures 1, 2:
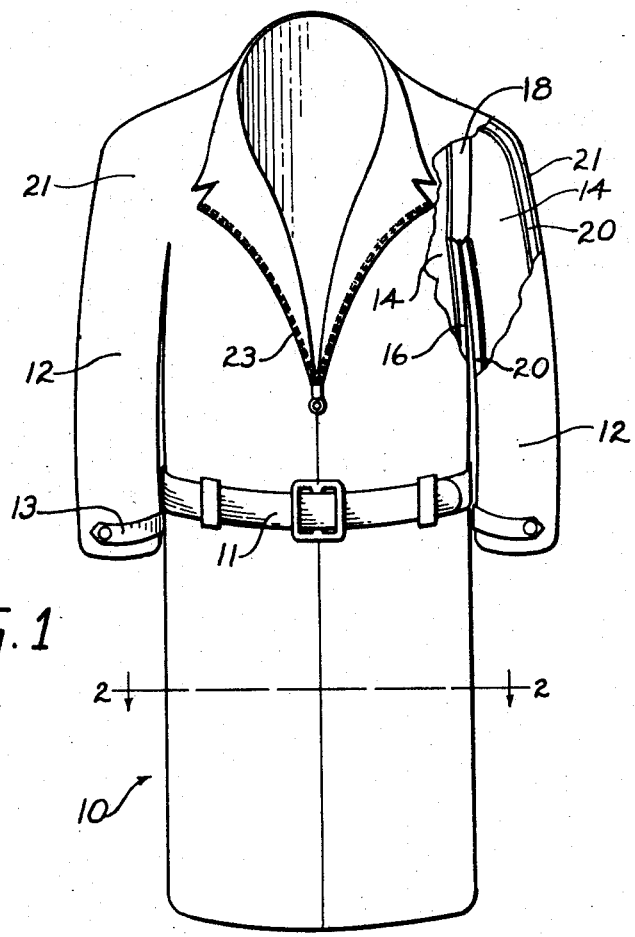

Dec. 22, 1942.   E. C. CRAIG ET AL   2,305,606
INSULATING WATERPROOF AND BUOYANT OVERCOAT
Filed Feb. 17, 1941

INVENTORS
E. C. Craig
G. W. Leyde
BY
ATTORNEY

Patented Dec. 22, 1942

2,305,606

UNITED STATES PATENT OFFICE 2,305,606

INSULATING WATERPROOF AND BUOYANT OVERCOAT

Edward C. Craig, United States Navy, and Glen W. Leyde, Arlington, Va.

Application February 17, 1941, Serial No. 379,368

2 Claims. (Cl. 9—20)

(Granted under the act of March 3, 1883, as amended April 30, 1928; 370 O. G. 757)

This invention relates to an insulating waterproof and buoyant overcoat and has for an object to provide an overcoat having an interlining of buoyant and waterproof and windproof material, such as expanded cellular rubber.

A further object of this invention is to provide an overcoat of the above characteristics having an appearance similar to any conventional overcoat.

A further object of this invention is to provide an overcoat of such conventional appearance that it may be worn anywhere, yet is particularly useful for operating personnel on shipboard in protecting the wearer against wind and spray around the decks of a vessel and acting as a lifesaver should the wearer fall into the sea.

With the foregoing and other objects in view, the invention consists in the construction, combination and arrangement of parts hereinafter described and illustrated in the drawing, in which—

Figure 1 is a partly broken-away elevational view of the overcoat of this invention; and Figure 2 is a sectional view on line 2—2 of Figure 1.

There is shown at 10 the overcoat of this invention which as seen is conventional in appearance, being provided with a belt 11 and sleeves 12 having wrist tightening straps 13. This overcoat 10 is made of an interlining 14 comprising a back section 15 secured by vulcanizing strips 16 to two front sections 17. Above the vulcanizing strips 16 armholes are provided for securing the sleeves 12 thereto by means of vulcanizing strips 19, each sleeve 12 including an interlining of the same material, the two sections secured together by vulcanizing strips 20. An outer covering 21 of suitable cloth material, such as whipcord or gabardine, is provided and similarly there is also provided an inner cloth covering 22 such as light gabardine or flannel. A separable fastener 23 is provided for closing the front of the coat, this fastener 23 being preferably secured to the inner covering while the outer covering 21 has sufficient overlap as at 24 beyond the edges of the sections 17 that the separable fastener 23 will be completely concealed when the front of the overcoat is closed.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. An insulating waterproof and buoyant overcoat comprising an interlining of insulating, waterproof and buoyant material, an inner covering and an outer covering, said interlining comprising vertically extending sections of form-retaining expanded cellular rubber, said sections comprising a back section and a pair of front sections and vulcanizing strips joining the vertical edges of said back section to the vertical edges of said front sections.

2. An insulating waterproof and buoyant overcoat comprising an interlining of insulating, waterproof and buoyant material, an inner covering and an outer covering, said interlining comprising vertically extending sections of form-retaining expanded cellular rubber, said sections comprising a back section and a pair of front sections and vulcanizing strips joining the vertical edges of said back section to the vertical edges of said front sections, an inner cloth covering for said interlining, an outer cloth covering for said interlining, and a separable fastener on said inner covering, said outer covering overlapping and concealing said separable fastener when in closed position.

EDWARD C. CRAIG.
GLEN W. LEYDE.